United States Patent [19]
Wadzinski

[11] Patent Number: 5,979,305
[45] Date of Patent: Nov. 9, 1999

[54] METHOD AND APPARATUS FOR CONTROLLING DEFLECTION OF A ROLL

[75] Inventor: Michael Wadzinski, Menasha, Wis.

[73] Assignee: Appleton Papers, Inc., Appleton, Wis.

[21] Appl. No.: 09/048,343

[22] Filed: Mar. 26, 1998

[51] Int. Cl.[6] .................................................. B30B 15/34
[52] U.S. Cl. .................................. 100/38; 72/245; 492/7; 492/46; 100/35; 100/162 B; 100/329; 100/334
[58] Field of Search ........................ 100/35, 38, 162 B, 100/329, 334, 335; 72/245; 492/2, 5, 7, 20, 46

[56] References Cited

U.S. PATENT DOCUMENTS

| | | |
|---|---|---|
| 1,145,558 | 7/1915 | Coppage . |
| 2,529,684 | 11/1950 | Gass . |
| 2,651,103 | 9/1953 | Hornbostel . |
| 2,689,392 | 9/1954 | Robertson . |
| 2,996,784 | 8/1961 | Young . |
| 3,055,083 | 9/1962 | Stöbi . |
| 3,086,279 | 4/1963 | Alexeff . |
| 3,110,527 | 11/1963 | Fox . |
| 3,494,675 | 2/1970 | Hold et al. ................................. 492/7 |
| 3,559,262 | 2/1971 | Glenn et al. . |
| 3,604,087 | 9/1971 | Beck . |
| 3,802,044 | 4/1974 | Spillmann et al. . |
| 3,854,646 | 12/1974 | Dorfel et al. . |
| 3,885,283 | 5/1975 | Biondetti . |
| 3,921,514 | 11/1975 | Biondetti . |
| 4,058,877 | 11/1977 | Lehmann . |
| 4,091,517 | 5/1978 | Lehmann et al. . |
| 4,175,803 | 11/1979 | Roberts . |
| 4,249,290 | 2/1981 | Lehmann . |
| 4,485,540 | 12/1984 | Riihinen . |
| 4,520,723 | 6/1985 | Pav et al. . |
| 4,583,273 | 4/1986 | Schnyder et al. . |
| 4,678,287 | 7/1987 | Allard ................................. 100/162 B |
| 4,757,585 | 7/1988 | Niskanen ................................... 492/7 |
| 4,860,416 | 8/1989 | Masui et al. . |
| 4,864,703 | 9/1989 | Biondetti et al. .......................... 492/7 |
| 4,903,517 | 2/1990 | Van Haag et al. . |
| 4,913,051 | 4/1990 | Molinatto . |
| 4,916,748 | 4/1990 | Schrörs . |
| 5,007,152 | 4/1991 | Tomizawa et al. . |
| 5,111,565 | 5/1992 | Beaudreault et al. . |
| 5,208,956 | 5/1993 | Wenzel et al. . |
| 5,244,448 | 9/1993 | Niskanen et al. . |
| 5,290,223 | 3/1994 | Lehmann . |
| 5,495,798 | 3/1996 | Niskanen et al. ................... 100/162 B |
| 5,566,451 | 10/1996 | Niskanen et al. . |

FOREIGN PATENT DOCUMENTS

| | | |
|---|---|---|
| 2157606 | 10/1985 | United Kingdom . |
| 88/07634 | 10/1988 | WIPO . |

OTHER PUBLICATIONS

"Swimming Rolls, The Simple Answer to Effective Nip Control Under all Loading Conditions", by Hunt & Moscrop, Finishing Division of Voith Sulzer Papertechnology, 16 pages.

"Econip Rolls –The Efficient Way to Achieve Effective NIP Control", Voith Sulzer Papertechnology, 6 pages.

*Primary Examiner*—Stephen F. Gerrity
*Attorney, Agent, or Firm*—Birch, Stewart, Kolasch & Birch, LLP

[57] ABSTRACT

A method and apparatus for controlling a deflection roll for compressing a web of material includes a shaft and a hollow roll disposed around the shaft. The hollow roll includes a working surface where the hollow roll is engageable with a hard roll along an entire length of the working surface. At least two bearing devices are disposed within the roll and are substantially aligned with the working surface of said roll. Each bearing device has a predetermined positive bearing clearance facilitating displacement of each outer contact surface relative to a respective inner contact surface of each bearing. The deflection roll further includes a mechanism for displacing the working surface of the roll with a fluid where the displacing mechanism is disposed external to the bearing devices. The displacing mechanism moves the working surface to at least one of a first, second, and third positions where the roll provides a force distribution along said working surface which substantially increases surface quality of the web of material.

34 Claims, 5 Drawing Sheets

METHOD AND APPARATUS FOR CONTROLLING DEFLECTION OF A ROLL

BACKGROUND OF THE INVENTION

The present invention relates to a method and apparatus for controlling the deflection of a roll. A deflection roll employs a shaft and a hollow roll disposed around the shaft which is supported by at least two bearing devices. The bearing devices are disposed within the hollow roll and are positioned along a working surface of the hollow roll. The bearing devices are also located outside two fluid chambers formed within the hollow roll. The working surface of the hollow roll is defined by the width of the web of material (preferably paper) being processed. The working surface of the hollow roll is engageable with a hard roll. Each of the bearing devices includes an inner race fastened to the shaft and an outer race positioned around the inner race with a predetermined positive bearing clearance existing between each inner race and a respective outer race. The method and apparatus for controlling deflection of the roll provide a force distribution along the working surface of the hollow roll which substantially increases surface quality of a web of material that is pressed against the solid roll by the hollow roll.

DESCRIPTION OF THE BACKGROUND ART

Various hollow rolls which include pressurized chambers disposed within a central nonrotating shaft currently exist. Such devices use (tight fit) spherical roller bearings to support ends of the hollow rolls around nonrotating support shafts. Such hollow rolls with pressurized chambers therein are commonly known as "swimming rolls" and create uneven force distributions along working surfaces of the hollow rolls which are detrimental to the surface quality of a web of material which engages with the working surface of the hollow rolls.

Frequently, such "swimming rolls" of the background art create a "W" profile of a web of material being processed. The "W" profile denotes the cross-sectional shape of a web of material which directly corresponds to the cross-sectional shape of the working surface of a hollow roll that has unequal force distributions thereon as a result of the hard roll pressing the web of material against the solid roll. The uneven or unequal force distribution present along the working surface of the hollow rolls of the background art has at least one inflection point where the force distribution changes magnitude abruptly. These abrupt changes in force values is attributed to at least two engineering design flaws in the background art: the relative placement of the spherical (tight fit) roller bearings of a hollow roll outside of the working surface; and the differential heating of the central shaft and the hollow roll where the central shaft expands and moves the tight fit bearing against the hollow roll while the hollow roll increases in size due to thermal expansion.

FIG. 15 shows background art where a hollow roll H is supported on a shaft S by tight fit roller bearing B which are located outside of fluid chambers $C_1$ and $C_2$. The chambers $C_1$ and $C_2$ include end seals E which are located outside of the region of contact with solid roll R. The deflection of chamber $C_1$ of hollow roll H shows an undesirable "W" profile which creates a profile of similar geometry in a web of material (not shown). The "W" profile is created because the hollow roll H must bend in a smooth curve around a fulcrum point P at the end of the working surface. A high pressure zone is created near the fulcrum, while a low pressure zone is created at a position inboard and away from the fulcrum.

In view of this undesirable "W" profile of the web of material, a need in the art exists for a method and apparatus for controlling the deflection of a roll which provides a force distribution with a substantially reduced number of inflection points along a working surface of the hollow roll which substantially increases surface quality of the web of material.

SUMMARY OF THE INVENTION

Accordingly, it is a primary object of the present invention to provide a method and apparatus for controlling deflection of a roll which provides a force distribution along a working surface of a hollow roll that substantially increases surface quality of a web of material.

It is a further object of the present invention to provide a deflection roll that can produce at least one of a positive crown, a negative crown, and a substantially linear or flat crown shape of the hollow roll.

Another object of the present invention is to provide a method and apparatus for controlling deflection of a roll which includes loose fit or "sloppy" bearings that have a positive bearing clearance which permits relative translational movement of an outer bearing race with respect to an inner bearing race that is beyond tolerances which are lost due to heat, friction, and/or deficient lubricant temperature control around and through the contact surfaces of the bearings and/or tolerances lost due to shaft deflection. In other words, the positive bearing clearance is substantially greater than tolerances/spacings that are provided in the design of conventional deflection rolls (swim rolls).

It is a further object of the present invention to provide a method and apparatus for controlling deflection of a roll which substantially eliminates the fulcrum affect created by tight fit bearing devices which are located outside a working surface of a hollow roll.

Another object of the present invention is to provide a method and apparatus for controlling deflection of a roll which permits thermal expansion of a central shaft and hollow roll without producing reactive forces which create inflection points along the force distribution of a working surface of the hollow roll.

It is further object of the present invention to provide a method and apparatus for controlling deflection of a roll which provides a force distribution along a working surface of the hollow roll with a reduced number of inflection points in addition to producing at least one of a positive, a negative, and a substantially flat or linear crown shape of the hollow roll by varying internal pressure within the hollow roll.

Another object of the present invention is to provide a method and apparatus for decreasing a width between the internal bearing devices of a deflection roll where the width is substantially equal to the width of a web of material. This, in turn, permits the web processing machine to be made more narrower and to substantially reduce the size of the overall web material processing system.

Another object of the present invention is to provide loose fit or "sloppy" bearings for a hollow roll which are cooled by at least one of fluid emitted from a central shaft which supports the hollow roll and other heat exchanging mechanisms.

These and other objects of the present invention are fulfilled by providing a method for controlling deflection of a roll comprising the steps of: providing a shaft; providing a hollow roll around the shaft; providing at least two bearings with inner and outer contact surfaces within the roll and aligned with a working surface of the roll; overlaying a web of material on the working surface of the roll; moving the working surface of the roll to at least one of a first, second, and third positions; engaging portions of each inner race adjacent to a first side of the shaft with respective portions of a respective outer race while disengaging portions of each inner race adjacent to a second side of the shaft from respective portions of a respective outer race when moving the working surface of the hollow roll into the first position; engaging portions of each inner race adjacent to the first side of the shaft with respective portions of a respective outer race while disengaging portions of each inner race adjacent to the second side of the shaft from respective portions of a respective outer race when moving the working surface into the second position; and engaging portions of each inner race adjacent to the second side of the shaft with respective portions of the outer race while disengaging portions of each inner race adjacent to the first side of the shaft from respective portions of a respective outer race when the moving the working surface into the second position; and providing a force distribution along the working surface of the roll in the first, second, and third positions which substantially increases surface quality of the web of material.

In addition, these and other objects of the present invention are also accomplished by providing a deflection roll for compressing a web of material comprising: a shaft; a hollow roll disposed around the shaft, the hollow roll including a working surface, the hollow roll being engageable with a hard roll along an entire length of the working surface; at least two bearing devices disposed within the roll and substantially aligned with the working surface of the roll, each bearing device having a predetermined positive bearing clearance facilitating displacement of outer bearing contact surfaces with respect to inner bearing races; and means for displacing the working surface of the roll, said displacing means including a fluid, the displacing means being disposed external to the bearing devices, the displacing means moves the working surface to at least one of a first, second, and third positions, the roll provides a force distribution along the working surface in the first, second, and third positions which substantially increases surface quality of the web of material.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
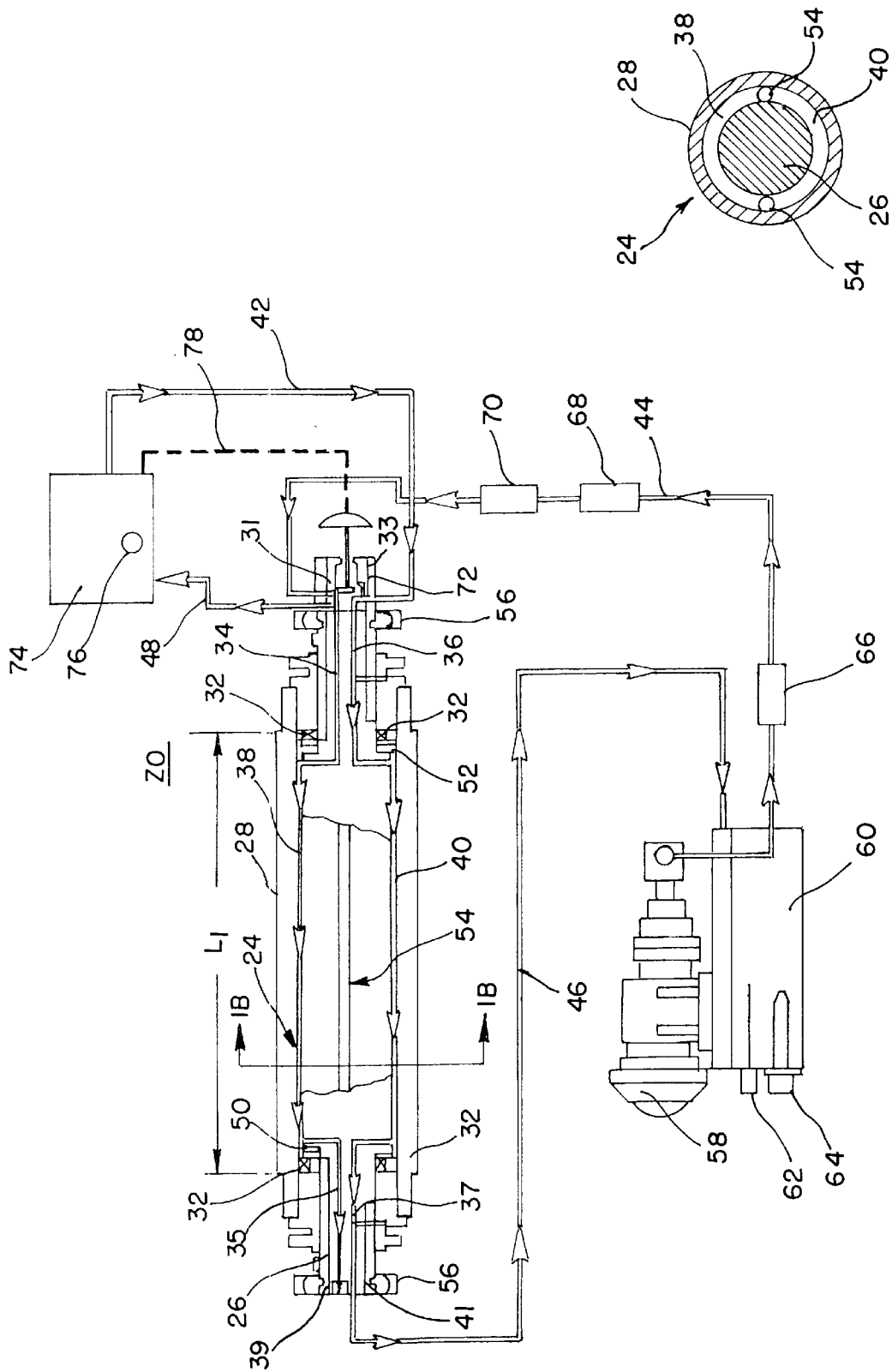
FIG. 1A is a schematic of the deflection roll of the present invention.
FIG. 1B is a cross-sectional view of the deflection roll of the present invention.

Referring in detail to the drawings and with particular reference to FIG. 1A, the deflection roll 20 for compressing a web of material 22 (see FIG. 2) is shown. The deflection roll 20 includes a hollow roll or shell 24 which rotates about a shaft 26 while the shaft 26 is preferably centrally disposed within the hollow roll 24 and nonrotatable or fixed relative to the roll 24. It is not beyond the scope of the present invention to include a central shaft 26 which is also movable relative to the hollow roll 24.

It is contemplated that the deflection roll 20 of the present invention will be used in a paper manufacturing process where the web of material 22 includes paper making materials. However, other uses of the deflection roll 20 with other processes are not beyond the scope of the present invention. Other processes include, but are not limited to, cardboard manufacturing process, fabric making processes, and other like processes which include webs of material which are compressed by deflection rolls. The deflection roll 20 can be employed in other applications such as fourdriner, wet presses, breaker stacks, size presses, machine calenders, soft nip calenders, supercalenders, coaters, combining calenders, gloss calenders, and temperature gradient calenders and other like structures.

The hollow roll 24 includes a working surface 28 which has a length $L_1$. The working surface 28 is defined according to the width of the web of material (preferably paper) being processed (see FIG. 2) which contacts the hollow roll 24. The width of the web or paper may optionally be supported by a deformable material such as a plastic covering attached to the hollow roll 24. While the hollow roll 24 is designed to work with a hard roll 30, other rolls which mate with the hollow roll 24 are not beyond the scope of the present invention. Other rolls include, but are not limited to hollow rolls, a combination of hollow rolls and hard rolls mounted coaxially together, and other like roll pressing structures.

The hollow roll 24 is supported on the central shaft 26 by bearing devices 32 which are symbolically shown by representations in FIG. 1. The bearings 32 shown in FIG. 1 are loose fit or "sloppy" bearings which provide a positive bearing clearance 84 between races which are included in each respective bearing device 32. It is contemplated that the bearing devices 32 of the present invention can include a sleeve or spherical roller bearings as long as positive bearing clearance 84 (see FIG. 2) can be maintained between respective races or bearing rollers 83 and races 80, 82 in each bearing device 32. However, other bearing devices are not beyond the scope of the present invention. Other bearing devices include, but are not limited to, straight roller bearings, spherical roller thrust bearings, tapered roller thrust bearings, needle roller bearings, tapered roller bearings, steep-angle tapered roller bearings, flanged sleeve bearings, and other like journal and/or roller bearings. Further details of the bearing devices 32 are discussed below with reference to FIG. 2.

The central shaft 26 includes a plurality of passageways 34, 35, 36, 37 which provide fluid to a first fluid chamber 38 and a second fluid chamber 40. The central shaft 26 further includes passageways 31, 33, 39, and 47 for transferring heat from the bearing devices 32. The deflection roll 20 further includes conduits 42, 44, 46 and 48 which also move fluid to and from the central shaft 26 and first and second fluid chambers 38, 40. The first and second fluid chambers 38, are defined by end seals 50, 52 and shaft mounted longitudinal seals 54. The central shaft 26 and hollow roll 24 are preferably made of steel. However, other materials are not beyond the scope of the present invention. Other materials include, but are not limited to, ferrous alloys, non-ferrous alloys, ceramic materials, polymers, composite materials and other like materials. It is not beyond the scope of the present invention where the hollow roll 24 includes a rubber coating covering the working surface.

The central shaft 26 is supported by conventional tight fit bearing devices 56 which are located outside of the working surface 28 and the hollow roll 24. The bearing devices 56 are preferably spherical thrust or journal bearings. However, as noted above, other bearings are not beyond the scope of the present invention, especially if the center shaft 26 is designed to rotate relative to the hollow roll 24. Other bearing devices include, but are not limited to, straight roller bearings, spherical roller thrust bearings, taper roller thrust bearings, needle roller bearings, tapered roller bearings, steep-angle tapered roller bearings, flange sleeve bearings, and other like journal and/or roller bearings. In the preferred embodiment, the central shaft 26 is designed to be stationary relative to the hollow roll 24. During a loading condition where the hollow roll 24 engages with a hard or solid roll 30, the central shaft 26 deflects under such loading conditions. The deflection roll 20 during this loading condition is designed to provide increased fluid pressure within the first fluid chamber 38 to compensate for the deflection of the center shaft 36.

To provide pressurized fluid within the first fluid chamber 38, the deflection roll 20 preferably includes means 58 for moving fluid through the conduits 42, 44, 46, 48 and the first and second fluid chambers 38, 40. The means 58 for moving the fluid preferably includes a hydraulic pump. The fluid of the preferred embodiment of the invention is oil, but other fluids are not beyond the scope of the present invention. Other fluids include, but are not limited to, air, water and other like incompressible fluids. While the means 58 for moving fluid is preferably a hydraulic pump, other pressure devices are not beyond the scope of the present invention. Other pressure devices include, but are not limited to, compressor, turbines, and other like hydraulic pressure devices. The means 58 for moving the fluid also includes a fluid reservoir 60.

Deflection roll 20 further includes means 62 for monitoring the temperature of the fluid in the fluid reservoir 60. The means 62 for monitoring the temperature of the fluid preferably includes a temperature probe which sends data back to a central controller (not shown). The deflection roll 20 further includes means 64, 66 for changing temperature of the fluid moving through the first and second fluid chambers 38, 40. The means 64, 66 for changing temperature of the fluid preferably includes a fluid heater 64 and a fluid cooler 66. The fluid heater 64 is preferably an oil heater while the fluid cooler 66 is preferably an oil cooler which is cooled by a water-type heat exchanger unit. The deflection roll 20 further includes a fail-safe device 68 which activates an alarm or unloads the deflection roll 20 if the flow of fluid through conduit 44 stops or is interrupted.

A fluid filter 70 is disposed along the conduit 44. The filter 70 removes any debris or particulate matter that is formed during the operation of the deflection roll 20.

The central shaft 26 on one end preferably includes a pressure regulating valve 72 which is controlled by a pressure control unit 74. While the pressure control unit 74 is preferably controlled by an operator, the pressure control unit 74 can be a programmable logic controller (PLC) or a general purpose microcomputer which includes a central processing unit (CPU). Other control units include, but are not limited to, hard wired or preprogrammed (fixed data) electronic devices, mechanical configurations which employ multiple gears and/or belts for timing mechanisms or other like structures. The pressure control unit 74 can be coupled to a central controller (not shown) which may also be a general purpose computer.

The pressure control unit 74 includes a pressure control valve 76. The pressure control unit 74 controls the pressure regulating valve 72 by a pressure control signal line 78. The pressure control unit 74 monitors the pressure in the first chamber 38 and actuates the pressure regulating valve 72 to achieve a predetermined pressure within the first fluid chamber 38. The pressure regulating valve 72 opens and closes to permit intermittent fluid flow from the fluid passageway 34 into the fluid passageway 36 within the central shaft 26.

The first fluid chamber 38 is preferably designed to be a pressurized chamber whereas the second fluid chamber 40 is preferably designed as an unpressurized chamber that receives drainage from the first fluid chamber 38. However, other pressurized chamber designs are not beyond the scope of the present invention and therefore, the second fluid chamber 38 could also be designed as a pressurized chamber so that fluid could be exerted against portions of the hollow roll 24 adjacent the second fluid chamber 40.

The pressure control unit 74 permits an operator to control the amount and type of deflection that is desired for the deflection roll 20. With the pressure control unit 74, the unit itself or an operator can select at least one of a positive crown, a negative crown, and a substantially linear or flat crown shape of the hollow roll 24 in order to compensate for the deflection of the central shaft 26 and to adjust the profile of the web of material 22 that is pressed between the working surface 28 and the hard or solid roll 30. The deflection roll 20 allows an operator or a central controller (not shown) to monitor the quality of the web of material 22 and to adjust the shape of the hollow roll 24 at any stage during the processing of the web of material 22.

FIG. 1B shows a cross-sectional view of the deflection roll 20 and further illustrates the respective designs of the first fluid chamber 38 and the second fluid chamber 40. The first fluid chamber 38 is defined by the volume or space between the central shaft 26 and the hollow roll 24 which is on a first side of the shaft longitudinal seals 54. The first fluid chamber 38 basically defines a volume of space which is analogous to a one-half cylindrically shaped or crescent shaped shell which overlays the central shaft 26.

The second fluid chamber 40 is similar in shape to the first fluid chamber 38. The shaft longitudinal seals 54 are spring loaded so that the seals 54 maintain contact with the hollow roll 24 during deflection of both the central shaft 26 and the hollow roll 24. However, the shaft longitudinal seals 54 are also preferably designed to permit a certain amount of fluid to pass into the second fluid chamber which is typically unpressurized to provide lubrication for the seals 54, end seals 50, and bearing devices 32. During operation of the deflection roll 20, the first fluid chamber 38 is preferably filled completely with fluid while the second fluid chamber is not completely filled and therefore is at a lower pressure relative to the first fluid chamber 38.

Figure 2:
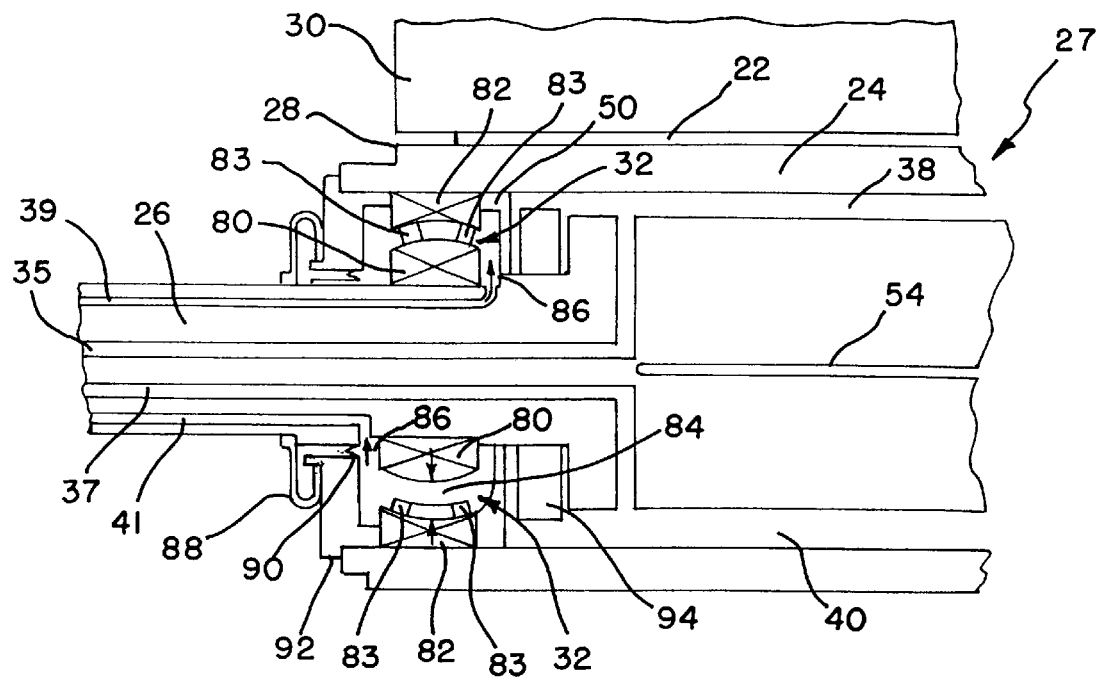
FIG. 2 is an enlarged cross-sectional view of a portion of the deflection roll of the present invention.
Figure 15:
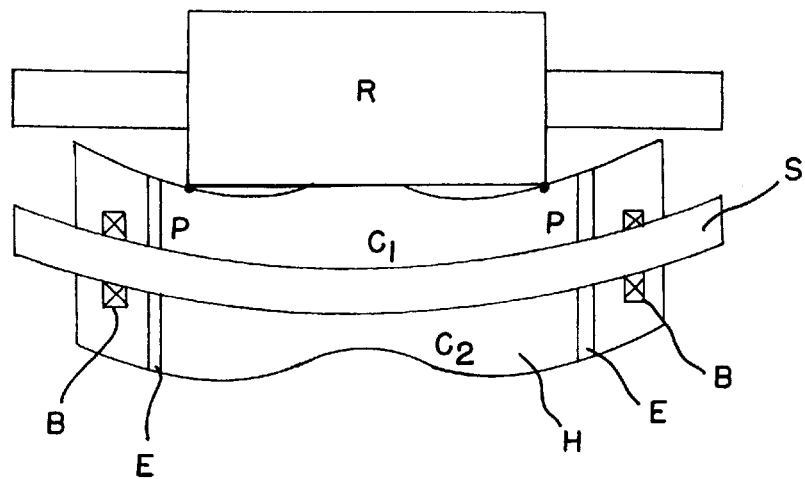
FIG. 15 is Background art of a deflection roll with an undesirable "W" profile.

Further details of the preferred embodiment of the bearing devices 32 are shown in FIG. 2. The bearing devices 32 are preferably disposed outside of the end seals 50 but inside the hollow roll 24 to be aligned with and to provide support (reactive forces) for the working surface 28. While the preferred embodiment shows the bearing devices 32 outside the end seals 50, it is not beyond the scope of the present invention to include the bearing devices 32 which are disposed inside of the end seals 50. The design of the preferred bearing devices 32 is to provide additional support for the working surface 28 and therefore the bearing devices 32 can be disposed at any point along or just outside the length L1 within the hollow roll 24 to provide support for the working surface 28.

The bearing devices 32 shown in FIG. 2 are illustrated as spherical roller bearings which include an inner race 80 coupled to the central shaft 26 and an outer race 82 which is coupled to an inner surface of the hollow roll 24. Rollers 83 are provided between races 80, 82. As noted above, central shaft 26 includes passageways 31, 33, 39, and 41 which provide a heat transfer fluid to and from the bearing devices 32. In one embodiment, a second means (not shown) for moving the heat transfer fluid can be provided to pressurize the heat transfer fluid. While the second means for moving fluid is preferably a hydraulic pump, other pressure devices are not beyond the scope of the present invention. Other pressure devices include, but are not limited to, compressor, turbines, and other like hydraulic pressure devices.

Pressurizing the heat transfer fluid at a pressure equal to or substantially greater than the pressure of the hydraulic fluid in the first and second chambers 38,40 prevents leaking or the hydraulic fluid of the first chamber from contacting the bearing devices 32. This pressurization of the heat transfer fluid substantially eliminates any temperature changes of the bearing devices 32 which occurs when the hydraulic fluid of the first chamber 38 contacts the bearing devices 32.

The heat transfer fluid of the preferred embodiment is bearing lubrication oil or hydraulic oil, but other fluids are not beyond the scope of the present invention. Other fluids include, but are not limited to, air, water and other like fluids. The inner race 80 has an outer diameter which is less than an inner diameter of the outer race 82 in order to form the positive bearing clearance 84. As noted above, the bearing devices 32 are not limited to spherical roller bearings and can include sleeve bearings as long as a positive bearing clearance 84 can be maintained between the respective races 80, 82 or bearing rollers 83 and bearing races 80, 82 in each bearing device 32. Other bearing devices include, but are not limited to, straight roller bearings, spherical roller thrust bearings, tapered roller thrust bearings, needle roller bearings, tapered roller bearings, steep-angle tapered roller bearings, flange sleeve bearings, and other like journal and/or roller bearings.

The positive bearing clearance 84 is designed to compensate for deflections of the central shaft 26 which occur when the hollow roll 24 engages with a hard or solid roll 30. The bearing devices 32 are referred to as "sloppy bearings" since the inner race 80 is loosely positioned within the outer race 82. Movement of the outer race 82 with respect to the inner race 80 may develop heat due to friction. To reduce the heating of the bearing devices 32, the deflection roll 20 preferably includes means 86 for cooling the bearing devices 32 which can include a jet or port in the central shaft 26 which connects to one of the fluid passageways therein such as fluid passageways 31, 33, 39, and 41. The fluid passageways 31, 33, 39 and 41 connect to a separate, second fluid source (not shown). It is contemplated that fluid passageways 31 and 39 provide high pressure cold bearing lubrication oil while fluid passageways 33 and 41 provide a return flow of low pressure bearing lubrication oil. The second fluid source (not shown) may also have mechanisms to control temperature of the heat transfer fluid, which in turn controls the temperature of the bearing devices 32.

However, other means 86 for cooling the bearing devices 32 are not beyond the scope of the present invention. Other bearing device cooling means 86 include, but are not limited to, spraying cool fluid from a valve, a mechanism for diverting hot fluid away from the bearing devices 32, and other like heat transfer mechanisms. Other alternatives for reducing heat within the bearing devices include machining out larger clearances between the hollow roll 24 and central shaft 26 at the bearing position to permit installation bearing devices 32 with larger clearances between the inner and outer races 80, 82. Another alternative includes installing bearings with larger clearances between rollers and races which can expand thermally without loosing the positive bearing clearances. The relative position of the outer race 82 with respect to the inner race 80 as shown in FIG. 2 occurs when the working surface 28 is moved or displaced in at least one of a first and second position where the hollow roll 24 creates a substantially linear/flat crown or a negative crown shape, respectively.

FIG. 2 also shows an end cover 88 in addition to a seal 90 which contain the heat transfer fluid around the bearing device 32. Seal 90 is supported by seal support cover 92. FIG. 2 also shows an end seal support ring 94 which supports end seal 50.

Further details of the first position and second position of the working surface 28 which provides a preferred interaction of the outer race 82 with respect to the inner race are discussed in further detail below with respect to FIGS. 3–9. A third position of the working surface 28 which provides a preferred interaction of the outer race 82 with respect to the inner race 80 where the hollow roll 24 is deflected to displace the working surface 28 in order to form a positive crown is discussed in further detail below with respect to FIGS. 11–14.

FIGS. 3–6 provide analysis of the force distribution relative to the hard or solid roll 30 and the central shaft 26. FIGS. 3–6 show the formation of a substantially linear or flat crown that occurs when the hollow roll 24 is deflected to react to forces $F_B$ exerted by the hard or solid roll 30 upon the hollow roll 24. Reference numeral $F_B$ denotes the forces created by bearings (not shown) which support the hard or solid roll 30. The forces $F_B$ are created when the bearings of the solid or hard roll 30 are used to press the hard roll or solid roll 30 against the hollow roll 24. $F_{56}$ denotes the reactive forces of bearing devices 56 which are created as a result of the forces $F_B$. Reference numeral $F_{32}$ denotes the forces of the bearing devices 32 which are result of the pressure exerted in the first fluid chamber 38 denoted as $F_{38}$.

The design of the preferred embodiments produce force distributions with a substantially reduced number of inflection points or no inflection points (where the forces abruptly change in at least one of magnitude and direction). In the second and third positions of the working surface 28 (the formation of negative and positive crowns), the force distribution thereof approaches a parabolic shape while in the first position of the working surface (a substantially linear or flat crown) the force distribution thereof is substantially linear. In each of the three preferred positions, no inflection points in the respective force distribution curves thereof are observed. Thus, such force distributions substantially reduce or eliminate the undesirable "W" profile present in the background art.

Figure 3:
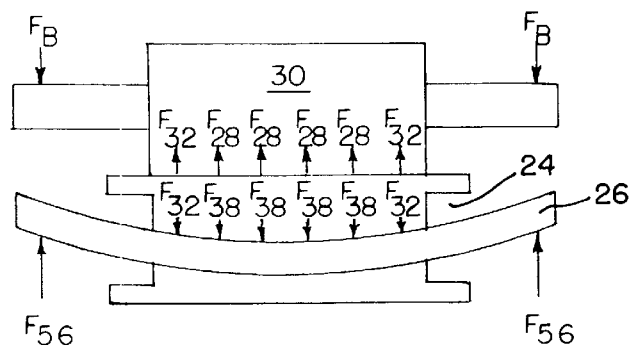
FIG. 3 is a schematic of the deflection roll when adjusting hydraulic pressure within the central shaft to create a substantially flat crown.

In the lower half of FIG. 3 (which shows the deflection roll 20), the forces $F_{32}$, $F_{38}$, and $F_{56}$ are defined with respect to the inertial reference frame of the central shaft 26. In the top half of FIG. 3, the forces $F_{32}$, $F_{38}$, and $F_B$ are defined according to the inertial reference frame of the hard or solid roll 30. The calculation of each of the forces relies on the theory that the hard or solid roll 30 is a rigid body while the central shaft 26 and hollow roll 24 are deformable bodies. The position of the hollow roll 24 with respect to the central shaft 26 in this Figure is denoted as a first position of the working surface 28. While the numeric values of the forces are not shown in the graphical representations of the force distributions, the value of each of the forces directly proportional to the area of each of the shaded areas shown in the graphs. The magnitude of each of the forces can be varied according to the desired application of the deflection roll 20.

Figure 4:
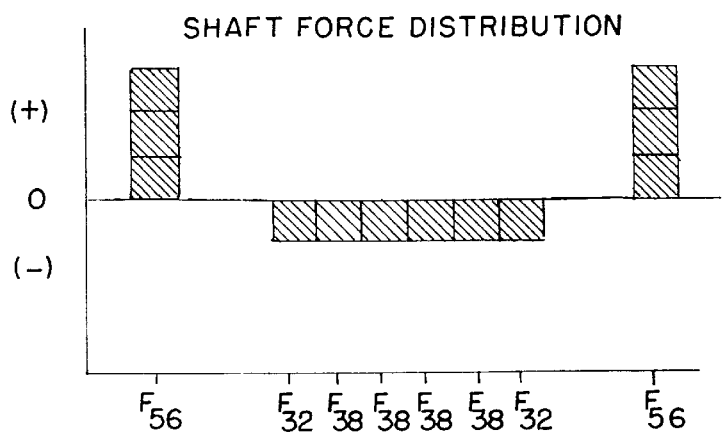
FIG. 4 is a graph showing the force distribution along the central shaft of the deflection roll during formation of a flat or substantially linear crown.

FIG. 4 defines the relative force distribution of the central shaft 26. By applying an appropriate amount of fluid pressure in the first fluid chamber 38, the forces within the fluid chamber 38 denoted as $F_{38}$ in addition to the reaction forces $F_{32}$ can balance or counteract the forces $F_{56}$ created by bearing devices 56 of the central shaft which are a result of the pressure exerted by the hard or solid roll 30. The forces $F_{38}$ of the first chamber 38 can move the working surface 28 to any desired position with respect to the central shaft 26.

FIG. 3 demonstrates how the fluid pressure of the first fluid chamber 38 can provide fluid pressure forces $F_{38}$ which combine with the forces $F_{32}$ of the bearing devices to balance or oppose the forces $F_B$ exerted to create the forces $F_{56}$.

Figure 5:
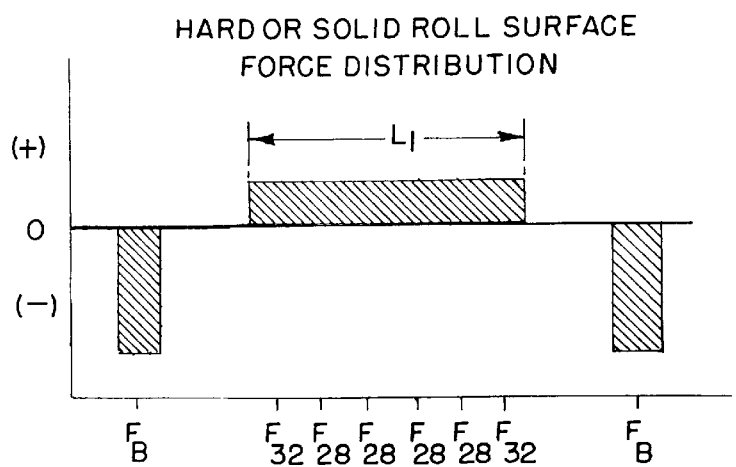
FIG. 5 is a graph of the force distribution along the working surface of the hollow roll relative to the hard or solid roll during formation of a flat or substantially linear crown.

FIG. 5 shows the relative force distribution along the working surface 28 relative to the inertial reference frame of a hard or solid roll 30. The bearing forces $F_B$ which press the hard roll 30 against the hollow roll 24 are balanced by the forces $F_{38}$ of the first fluid chamber 38 and the forces $F_{32}$ of the bearing devices 32. Since the forces $F_B$ which create forces $F_{56}$ of the central shaft are balanced by the bearing forces $F_{32}$ and pressure forces $F_{38}$ of hollow roll 24, a substantially linear or planar crown is formed along the working surface 28.

Figure 6:
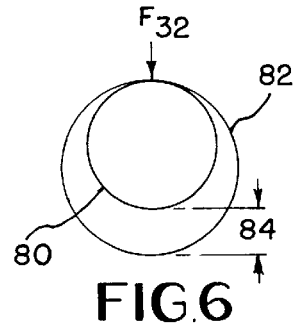
FIG. 6 is a side view of one of the internal bearing devices roll during formation of a flat or substantially linear crown.

FIG. 6 shows the relative positions of the inner and outer races 80, 82 when a substantially flat or linear crown is formed by the hollow roll 24 (where the working surface 28 is in a first position).

FIGS. 7–10 show the respective force distributions of the hollow roll 24 and the solid or hard roll 30 when the working surface 28 of the hollow roll 24 is moved into a second position to form a negative crown. The force designations of FIGS. 7–10 are similar to those shown in FIGS. 3–6 and therefore no further explanation of the forces is necessary.

Figure 7:
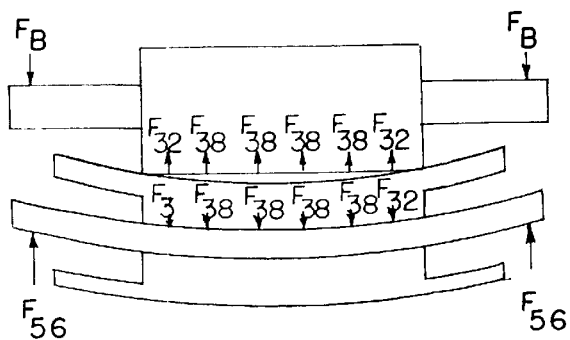
FIG. 7 is a schematic of the deflection roll when adjusting hydraulic pressure within the central shaft to create a negative crown.
Figure 8:
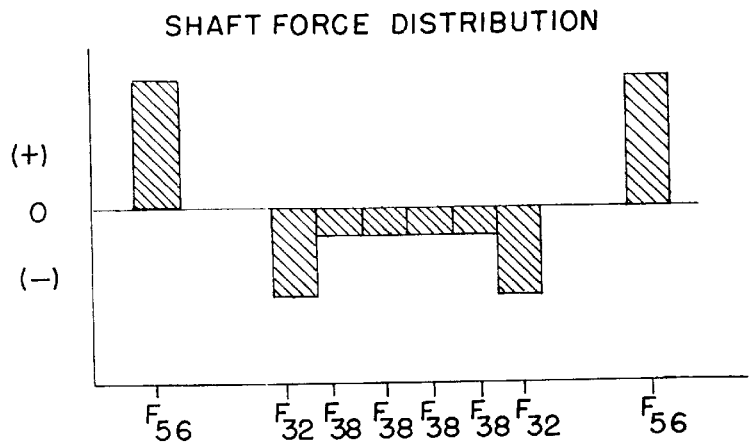
FIG. 8 is a graph showing the force distribution along the central shaft of the deflection roll during formation of a negative crown.
Figure 10:
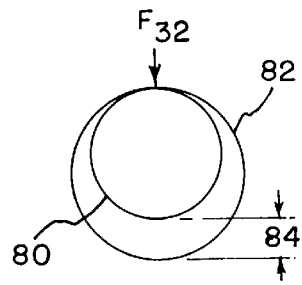
FIG. 10 is a side view of one of the internal bearing devices formation of a negative crown
Figure 9:
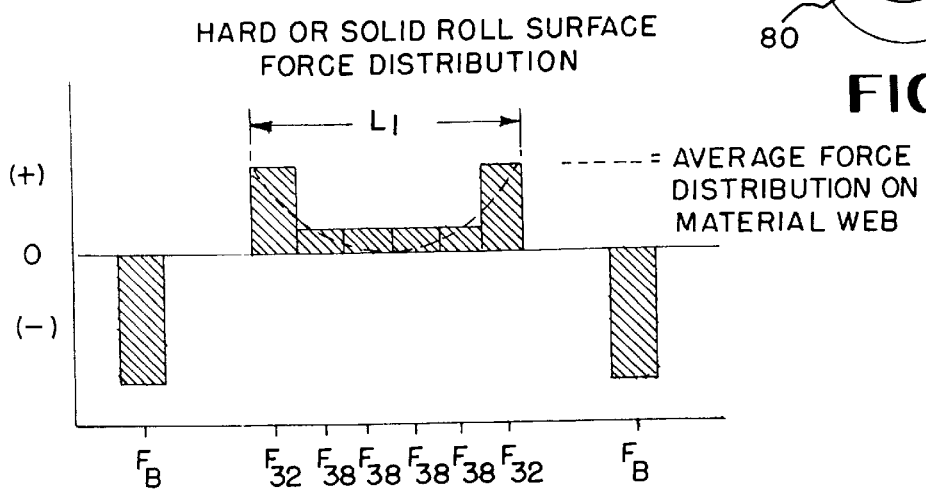
FIG. 9 is a graph of the force distribution along the working surface of the hollow roll relative to the hard or solid roll during formation of a negative crown.
Figure 11:
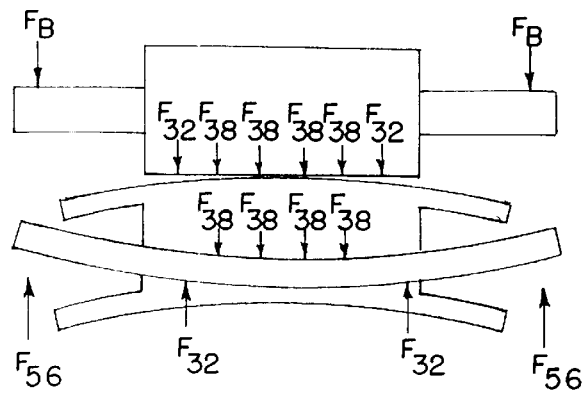
FIG. 11 is a schematic of the deflection roll when adjusting hydraulic pressure within the central shaft to create a positive crown.
Figure 14:
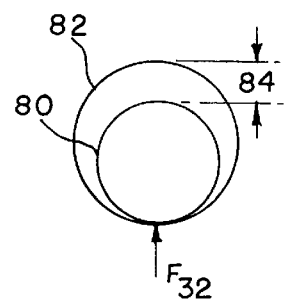
FIG. 14 is a side view of one of the internal bearing devices during formation of a positive crown.
Figure 12:
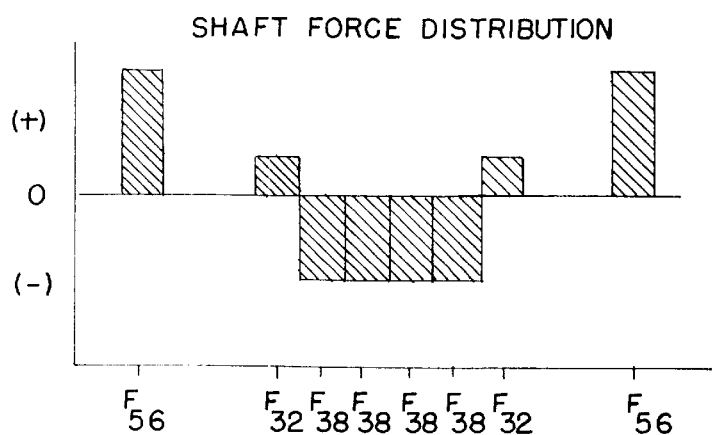
FIG. 12 is a graph showing the force distribution along the central shaft of the deflection roll during formation of a positive crown.
Figure 13:
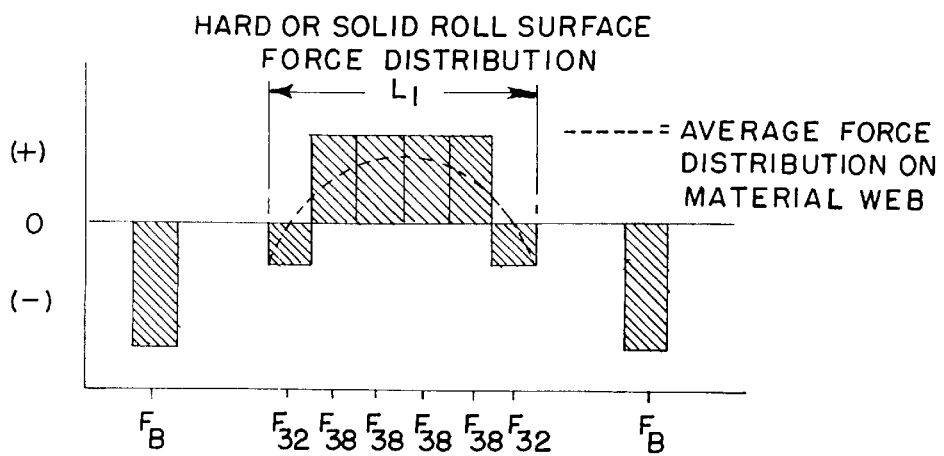
FIG. 13 is a graph of the force distribution along the working surface of the hollow roll relative to the solid or hard roll during formation of a positive crown.

In FIG. 7 and in FIG. 8, the pressure provided in the first fluid chamber 38 is decreased relative to the amount of pressure shown in FIG. 3. This decrease in pressure causes the reactive forces $F_{32}$ of the bearing devices to be increased. This increase of the reactive forces $F_{32}$ which are provided by the bearing devices 32 changes the respective geometrical shape of the hollow roll 24 and changes the resultant force distribution along the working surface 28. The web of material 22 deforms in accordance with the resultant force distribution in the hollow roll 24. The decrease in fluid pressure in the first fluid chamber 38 permits the operator to form a negative crown along the working surface 28 of the hollow roll 24. The bearing devices 32 permit the operator or a control unit to create a negative profile in the web of material 28 without any irregularities or surface discontinuities along the negative profile. As noted above, surface discontinuities present in the background art are due to the relative deflection of the working surface 28 as a result of tight fit bearings located outside the working surface 28 and thermal expansion of both the roll and central shaft. The force distribution which creates the "W" profile of the background art has numerous inflection points along resultant force distribution curve.

FIGS. 11–14 show the working surface 28 of the hollow roll 24 being moved into a third position due to increased pressure exerted in the first fluid chamber 38. FIGS. 11–14 show the respective force distribution of the hollow roll 24 in order to create a positive crown. Due to increased pressure in the first chamber 38, the hollow roll 24 having the working surface 28 is bowed or flexed in a convex manner and therefore, the outer race 82 moves in a translational manner with respect to the inner race 80. The reactive forces $F_{32}$ of the bearing devices 32 permit a positive crown to be formed by the hollow roll 24 without the undesirable "W" profile.

The invention provides a method for controlling deflection of a roll 20 where the steps include providing a shaft 26 and providing a hollow roll 24 around the shaft 26. The method also includes the steps of providing at least two bearings 32 with inner and outer races 80, 82 within the roll 24 and aligned with a working surface 28 of the roll 24. A web of material 22 is then overlaid on the working surface 28 of the roll 24.

Next, the working surface 28 of the roll 24 is moved into at least one of a first, second, and third positions. During movement of the working surface 28 into the first position (forming a substantially flat or linear crown), portions of each inner race 80 adjacent to a first side of the shaft 26 are engaged with respective portions of a respective outer race 82 while portions of each inner race 80 adjacent to a second side of the shaft 26 are disengaged from respective portions of a respective outer race 82.

During movement of the working surface 28 into the second position (forming a negative crown), portions of each inner race 80 adjacent to the first side of the shaft 26 are engaged with respective portions of a respective outer race 82 while portions of each inner race 80 adjacent to the second side of the shaft 26 are disengaged from respective portions of a respective outer race 82 when moving the working surface 28 into the second position.

During movement of the working surface 28 into the third position (forming a positive crown), portions of each inner race 80 adjacent to the second side of the shaft 26 are engaged with respective portions of the outer race 82 while portions of each inner race 80 adjacent to the first side of the shaft 26 are disengaged from respective portions of a respective outer race 82. The roll 20 provides a force distribution along the working surface 28 in the first, second, and third positions which substantially increases surface quality of the web of material.

The method also includes the steps of fastening each inner race to the shaft 26 and positioning each outer race 82 around a respective inner race 80 with a predetermined positive bearing clearance facilitating translational displacement of the outer race 82 relative to the inner race. The shaft 26 includes the first side spaced from the working surface 28 at a first distance and a second side spaced from the working surface 28 at a second distance. The second distance is substantially greater than the first distance.

The method also includes the steps of providing a solid roll 30 adjacent to the working surface 28 of the hollow roll 24 and pressing a web of material against the working surface 28 of the hollow roll 24 with the solid roll.

The method also includes the steps of providing fluid chambers 38, 40 within the shaft 26 and moving fluid through the chambers 38, 40 of the shaft 26. The method also provides for moving the working surface 28 of the roll 24 in at least one of the first position and the second position by pressing the fluid against an inner surface of the hollow roll 24 adjacent to the working surface 28.

The method includes monitoring a temperature of the fluid and changing the temperature of the fluid according to predetermined a predetermined threshold temperature. The method also includes providing a first fluid chamber 38 within the hollow roll 24 and providing a second fluid chamber within the hollow roll 24.

Pressure of the first fluid chamber 38 is monitored according to the method. Pressure of the first fluid chamber 38 is changed intermittently to a level which is substantially greater than pressure within the second fluid chamber 40.

The method also includes the steps of providing a first chamber 38 within the hollow roll 24 adjacent to the first side of the shaft 26 and providing a second chamber 40 within the hollow roll 24 adjacent to the second side of the shaft 26.

According to the method of the preferred embodiment, hydraulic fluid is pumped into the first chamber 38 and hydraulic fluid is drained from the first chamber 38 into the second chamber 40.

The method also provides a step of placing the bearings 32 at locations outside of the first and second chambers. The method also defines the working surface 28, where the working surface 28 includes a first end and a second end. One bearing 32 of the at least two bearings 32 is positioned within the hollow roll 24 at one of a location substantially aligned with the first end and just outside of the working surface 28. The method also provides for placing another bearing 32 of the at least two bearings within the hollow roll 24 at one of a location substantially aligned with the second end, just outside of the working surface 28, and a location between the two ends.

The method and apparatus provides a force distribution along a working surface 28 of a hollow roll 24 that substantially increases the surface quality of a web of material 22. The invention also provides a deflection roll 20 that can produce at least one of a positive crown, a negative crown, and a substantially linear or flat crown shape of the hollow roll 24.

The invention which includes a method and apparatus for controlling deflection of a roll provides loose fit or "sloppy" bearings that have a positive bearing clearance 84 which permits relative translational movement of an outer bearing race with respect to an inner bearing race.

The invention also provides a method and apparatus for controlling deflection of a roll which substantially eliminates the fulcrum affect created by tight fit bearing devices which are located outside a working surface 28 of a hollow roll.

The method and apparatus for controlling deflection of a roll permits thermal expansion of a central shaft 26 and hollow roll without producing reactive forces which create inflection points along the force distribution of a working surface of the hollow roll. The method and apparatus for controlling deflection of a roll provides a force distribution along a working surface of the hollow roll with a reduced number of inflection points in addition to producing at least one of a positive, a negative, and a substantially flat or linear crown shape of the hollow roll by varying internal pressure within the hollow roll.

The method and apparatus permits decreases in the width of hollow rolls which are designed to have an internal bearing device placement which is substantially equal to the width of a web of material. With such hollow rolls, web processing machines are made more narrower and substantially reduce the size of an overall web material processing system. The invention provides loose fit or "sloppy" bearings for a hollow roll which are cooled by at least one of fluid emitted from a central shaft which supports the hollow roll and other heat exchanging mechanisms.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for controlling deflection of a roll comprising the steps of:

providing a shaft having a first side on a working surface side of the roll, and a second side opposite the working surface side of the roll;

providing a hollow roll around the shaft;

providing at least two bearings with inner and outer contact surfaces within the roll and aligned with a working surface of the roll;

overlaying a web of material on the working surface of the roll;

moving the working surface of the roll to at least one of a first, second, and third positions;

engaging portions of each inner contact surface adjacent to said first side of the shaft with respective portions of a respective outer contact surface while disengaging portions of each inner contact surface adjacent to said second side of the shaft from respective portions of a respective outer contact surface when moving the working surface into the first position;

engaging portions of each inner contact surface adjacent to the first side of the shaft with respective portions of a respective outer contact surface while disengaging portions of each inner contact surface adjacent to the second side of the shaft from respective portions of a respective outer contact surface when moving the working surface into the second position;

engaging portions of each inner contact surface adjacent to the second side of the shaft with respective portions of the outer contact surface while disengaging portions of each inner contact surface adjacent to the first side of the shaft from respective portions of a respective outer contact surface when the moving the working surface into the third position; and providing a force distribution along the working surface of the roll in the first, second, and third positions which substantially increases surface quality of the web of material.

2. The method of claim 1, wherein said step of providing at least two bearings includes the step of providing bearings having at least one of sleeve contact surfaces and roller to race contact surfaces.

3. The method of claim 1, further comprising the steps of:

fastening each inner contact surface to the shaft; and positioning each outer contact surface around a respective inner contact surface with a predetermined positive bearing clearance facilitating displacement of the outer contact surface relative to the inner contact surface, the shaft including the first side spaced from the working surface at a first distance, the shaft including a second side spaced from the working surface at a second distance, the second distance being substantially greater than the first distance.

4. The method of claim 1, further comprising the steps of:

providing a solid roll adjacent to the working surface of the hollow roll; and pressing the web of material against the working surface of the hollow roll with the solid roll.

5. The method of claim 1, further comprising the steps of:

providing at least first and second fluid chambers within the shaft;

moving a first fluid through the chambers of the shaft; and moving the working surface of the roll in at least one of the first position and the second position by pressing the first fluid against an inner surface of the hollow roll adjacent to the working surface.

6. The method of claim 5, further comprising the steps of:

transferring heat from the bearings with a second fluid; and changing the temperature of the second fluid.

7. The method of claim 6, further comprising the step of pressurizing the second fluid at a predetermined pressure to prevent the first fluid in the first and second chambers from contacting the bearing devices.

8. The method of claim 5, further comprising the steps of:

monitoring a temperature of the first fluid; and changing the temperature of the first fluid according to a predetermined threshold temperature.

9. The method of claim 8, further comprising the steps of:

pumping hydraulic fluid into the first chamber; and draining hydraulic fluid from the first chamber into the second chamber.

10. The method of claim 8, further comprising the step of placing the bearings at locations outside of the first and second chambers.

11. The method of claim 1, further comprising the steps of:

providing a first fluid chamber within the hollow roll;

providing a second fluid chamber within the hollow roll;

monitoring pressure within the first fluid chamber; and changing pressure within the first fluid chamber to a level which is substantially greater than pressure within said second fluid chamber.

12. The method of claim 1, further comprising the steps of:

providing a first chamber within the hollow roll adjacent to the first side of the shaft; and providing a second chamber within the hollow roll adjacent to the second side of the shaft.

13. The method of claim 1, wherein the working surface includes a first end and a second end, the method further comprising the steps of:

placing one bearing of the at least two bearings within the hollow roll at one of a location substantially aligned with the first end, a location just outside of the working surface, and a location between the two ends; and placing another bearing of the at least two bearings within the hollow roll at one of a location substantially aligned with the second end, a location just outside of the working surface, and a location between the two ends.

14. The method of claim 1, further comprising the step of forming a substantially linear crown with the working surface of the hollow roll in the first position.

15. The method of claim 1, further comprising the step of forming a negative crown with the working surface of the hollow roll in the second position.

16. The method of claim 1, further comprising the step of forming a substantially positive crown with the working surface of the hollow roll in the third position.

17. A deflection roll for compressing a web of material comprising:

a shaft;

a hollow roll disposed around said shaft, said hollow roll including a working surface, said hollow roll being engageable with a hard roll along an entire length of said working surface;

at least two bearing devices having inner and outer contact surfaces, the bearing devices being disposed within said hollow roll and substantially aligned with said working surface of said hollow roll, each bearing device having a predetermined positive bearing clearance facilitating displacement of said outer bearing contact surfaces with respect to said inner bearing contact surfaces; and means for displacing said working surface of said hollow roll, said displacing means includes a fluid, said displacing means being disposed external to said bearing devices, said displacing means moves said working surface to at least one of a first, second, and third positions, said hollow roll provides a force distribution along said working surface in said first, second, and third positions which substantially increases surface quality of the web of material.

18. The deflection roll of claim 17, wherein each contact surface includes at least one of a race and a roller.

19. The deflection roll of claim 17, wherein the inner contact surface of each bearing device is fastened to said shaft and each outer contact surface is positioned around a respective inner contact surface.

20. The deflection roll of claim 19, wherein said shaft includes a first side spaced from said working surface at a first distance, said shaft includes a second side spaced from said working surface at a second distance, said second distance is substantially greater than said first distance, said outer contact surface portions of each inner contact surface adjacent to said first side of said shaft engage with respective portions of a respective outer contact surface while portions of each inner contact surface adjacent to said second side of said shaft disengage from respective portions of a respective outer contact surface when said working surface is moved into said first and second positions.

21. The deflection roll of claim 20, wherein portions of each inner contact surface adjacent to said second side of said shaft engage with respective portions of a respective outer contact surface while portions of each inner contact surface adjacent to said first side of said shaft disengage from respective portions of a respective outer contact surface when said working surface is moved into said third position.

22. The deflection roll of claim 17, wherein said displacing means includes fluid chambers within said shaft, said deflection roll further includes means for moving fluid through said chambers of said shaft.

23. The deflection roll of claim 17 further comprising:

means for monitoring a temperature of the fluid; and means for changing a temperature of the fluid according to predetermined a predetermined threshold temperature.

24. The deflection roll of claim 17, wherein said displacing means includes a first fluid chamber within said hollow roll and a second fluid chamber within said hollow roll, said deflection roll further includes means for monitoring pressure of said first fluid chamber and means for changing pressure of said first fluid chamber to a level which is substantially greater than pressure within said second fluid chamber.

25. The deflection roll of claim 24, wherein the shaft has a first side on a working surface side of the roll, and a second side opposite the working surface side of the roll, and said first chamber within said hollow roll is adjacent to said first side of said shaft and said second chamber within said hollow roll is adjacent to said second side of said shaft.

26. The deflection roll of claim 25, wherein said deflection roll further includes at least two pressure seals, each of said at least two bearings is disposed adjacent to a respective seal and outside of said chambers.

27. The deflection roll of claim 17, wherein the fluid is hydraulic fluid, said deflection roll further includes:

a first fluid chamber within said hollow roll and a second fluid chamber within said hollow roll;

means for pumping the hydraulic fluid into said first chamber; and means for draining the hydraulic fluid from said first chamber into said second chamber.

28. The deflection roll of claim 27, wherein said hydraulic pumping means includes a hydraulic pump and a hydraulic fluid reservoir.

29. The deflection roll of claim 17, wherein said working surface includes a first end and a second end, one bearing device of said at least two bearing devices is disposed within said hollow roll at one of a location substantially aligned with said first end of said working surface, a location between said first and second ends, and just outside of said working surface, and another bearing device of said at least two bearings is disposed within said hollow roll at one of a location substantially aligned with said second end of said working surface, and a location between said first and second ends, and just outside said working surface.

30. The deflection roll of claim 17, wherein said hollow roll has a substantially linear crown in said first position.

31. The deflection roll of claim 17, wherein said hollow roll has a substantially negative crown in said second position.

32. The deflection roll of claim 17, wherein said hollow roll has a positive crown in said third position.

33. The deflection roll of claim 17, wherein the fluid is a first fluid, and the roll further comprises means for removing heat from said bearing devices, said heat removing means includes a second fluid.

34. The deflection roll of claim 33, wherein said heat removing means further includes a means for changing the temperature of said second fluid.

* * * * *